United States Patent
Hermann

(10) Patent No.: US 7,382,355 B2
(45) Date of Patent: Jun. 3, 2008

(54) EXTRACTABLE TERMINAL KEYPAD

(75) Inventor: Fredrik Hermann, Malmö (SE)

(73) Assignee: Sony Ericsson Mobile Communications AB (SE)

( * ) Notice: Subject to any disclaimer, the term of this patent is extended or adjusted under 35 U.S.C. 154(b) by 246 days.

(21) Appl. No.: 10/550,031

(22) PCT Filed: Mar. 9, 2004

(86) PCT No.: PCT/EP2004/002370

§ 371 (c)(1),
(2), (4) Date: Sep. 21, 2005

(87) PCT Pub. No.: WO2004/086203

PCT Pub. Date: Oct. 7, 2004

(65) Prior Publication Data

US 2006/0202963 A1 Sep. 14, 2006

Related U.S. Application Data

(60) Provisional application No. 60/462,817, filed on Apr. 14, 2003.

(30) Foreign Application Priority Data

Mar. 25, 2003 (EP) ................. 03075865

(51) Int. Cl.
*G09G 5/00* (2006.01)
(52) U.S. Cl. .............. 345/168; 345/169; 345/170
(58) Field of Classification Search ........ 345/168–170; 455/90, 575; 310/309
See application file for complete search history.

(56) References Cited

U.S. PATENT DOCUMENTS

| 6,215,221 | B1 * | 4/2001 | Cabuz et al. ............... 310/309 |
| 2001/0003450 | A1 | 6/2001 | Hemie et al. |
| 2003/0050019 | A1 * | 3/2003 | Dowling et al. ............. 455/90 |

FOREIGN PATENT DOCUMENTS

| CN | 2490643 Y | 5/2002 |
| CN | 2496069 Y | 6/2002 |
| DE | 195 46 786 A1 | 6/1997 |
| WO | WO 00/54479 | 9/2000 |
| WO | WO 200054479 A2 * | 9/2000 |
| WO | WO 01/35202 A1 | 5/2001 |

OTHER PUBLICATIONS

International Search Report for PCT/EP2004/002370; Date of mailing Oct. 13, 2004.

* cited by examiner

*Primary Examiner*—Amare Mengistu
*Assistant Examiner*—Jennifer Zubajlo
(74) *Attorney, Agent, or Firm*—Myers Bigel Sibley & Sajovec, P.A.

(57) ABSTRACT

A terminal includes a terminal body, a data output interface, and a data input interface. The data output interface includes a display disposed on a face of the terminal body. The data input interface includes a keypad that is extractable from a storage space inside the terminal body. The keypad is disposed on a flexible film supported by a pulley that includes a retractor which is biased to retract the film into the storage space. The terminal body includes an activator that applies electrical current through the film. The film includes a material which is configured to change from a flexible mode to a stiff mode upon application of the current.

13 Claims, 3 Drawing Sheets

EXTRACTABLE TERMINAL KEYPAD

RELATED APPLICATIONS

The present application is a 35 U.S.C. §371 national phase application of PCT International Application No. PCT/EP2004/002370, having an international filing date of Mar. 9, 2004, and claiming priority to European Patent Application No. 03075865.0, filed Mar. 25, 2003, and to U.S. Provisional Patent Application No. 60/462,817 filed Apr. 14, 2003, the disclosures of all of which are incorporated herein by reference in their entireties. The above PCT International Application was published in the English language and has International Publication No. WO 2004/086203 A3.

FIELD OF THE INVENTION

The present invention relates to data input devices for data communication or processor terminals, such as mobile phones and computers. In particular the invention relates to keypad devices for such terminals.

BACKGROUND OF THE INVENTION

Since the end of the $20^{th}$ century the cellular telephone industry has had enormous development in the world. From the initial analog systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Different digital transmission schemes are used in different systems, e.g. time division multiple access (TDMA) or code division multiple access (CDMA). Currently, the cellular technology is entering the so called $3^{rd}$ generation, providing several advantages over the former, $2^{nd}$ generation, digital systems referred to above. Among those advantages an increased bandwidth will be provided, allowing effective communication of more complex data. The $3^{rd}$ generation of mobile systems have been referred to as the UMTS (Universal Mobile Telephony System) in Europe and CDMA2000 in the USA, and is already implemented in Japan to some extent. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

A lot of effort has been made in making smaller terminals, with much help from the miniaturisation of electronic components and the development of more efficient batteries. In only a couple of decades the communication systems have gone from analogue to digital, and at the same time the dimensions of the communication terminals have gone from briefcase size to the pocket size phones of today. Today, numerous manufacturers offer pocket-sized terminals with a wide variety of capabilities and services, such as packet-oriented transmission and multiple radio band coverage. Still today, mobile phones are getting smaller and smaller and the size is generally considered to be an important factor for the end customer. The development in electronics has made it possible to miniaturise the components of the terminals, at the same time making the terminals capable of performing more advanced functions and services. The development of new transmission schemes, the so-called $3^{rd}$ generation mobile system standing at the door and the $4^{th}$ generation to be expected maybe ten years later, also provides the possibility to convey more advanced data to the wireless communication terminals, such as real time video.

The end users have a number of conflicting requirements on the mobile phones. Basically, the terminal should be as small and light-weight as possible. Furthermore, is should provide more and more advanced functions, have a long battery time, and a user-friendly interface. As technology advances, new or previously implemented features can be miniaturised, rendering smaller terminals. This concerns e.g. battery technology and electronics. Still, there is only so much space in a terminal, and in order to be competitive the elements of the terminal must be carefully packaged. Built-in antennas of different types have eliminated the need for protruding antenna elements, but the most frequently used type of built-in antennas, the so called PIFA (Planar Inverted-F Antenna), will instead add to the height of the terminal since it must be placed a certain distance from the PCB ground plane in order to provide a sufficient bandwidth.

A trend within the fields of mobile telephony and pocket computers such as Personal Digital Assistants PDA:s, is to implement larger displays serving as data output interfaces. This is particularly interesting with the transmission schemes which make it possible to transmit and present video. Furthermore, such displays may also be touch-sensitive and serve as data input interfaces, preferably operated by means of a pen-like member. Still, it is recognised that many users prefer the traditional keypad, at least as a complement to the touch-sensitive display, with distinct separate keys which in many cases are considered to be easier to operate with the fingers. However, the keypad has the disadvantage of occupying space on a face surface of the terminal, space that e.g. could have been used to implement a larger display.

SUMMARY OF THE INVENTION

Hence, it is an object of the present invention to provide a compact design for a terminal devised with a keypad as a data input interface and a display as a data output interface. An aspect of that object is to provide a design in which the implementation of the keypad does not occupy space otherwise usable implementing a larger display.

According to a first aspect, this object is fulfilled by a terminal, comprising a terminal body, a data output interface including a display disposed on a face of said terminal body, and a data input interface including a keypad. Said keypad is extractable from a storage space inside said terminal body.

Preferably, said terminal body has a front face supporting said display, and a back face opposite said front face, wherein said keypad is extractable from an aperture disposed at a side of said terminal between said front face and said back face.

In one embodiment, said keypad is extractable from said storage space by a linear movement.

Alternatively, said keypad is extractable from said storage space by a rotational movement.

In such case, said keypad may be rotatable about a rotation axis securing said keypad to said terminal body, which rotation axis is substantially perpendicular to said front face.

Furthermore, said keypad may be connected to said terminal body via a lever.

The keypad is in a specific embodiment further rotatably connected to the lever.

In one embodiment, said keypad is disposed on a flexible film, supported by a pulley comprising retractor means, biased to retract said film into said storage space.

Preferably, said terminal body comprises activator means for applying an electrical current through said film, wherein said film comprises a material which is devised to change from a flexible mode to a stiff mode upon said current application.

In one embodiment, said pulley is devised to retract and roll up said film, when in a flexible mode, about a roller.

Preferably, detector means are devised to detect when said film has been extracted from said storage space to a fully extracted position, whereupon said detector means trigger said activator means to apply an electrical through said film.

Said pulley may comprise means for locking said retractor means when said film has been extracted from said storage space to a fully extracted position.

Preferably, said detector means are devised to detect when a pulling force is applied on said film when the film is located in said fully extracted position, whereupon said detector means controls said activator means to stop applying a current to said film.

In one embodiment, said film has a curved cross-section when extracted from said storage space.

In a preferred embodiment, said terminal is a radio communication terminal.

The detailed description shows specific features of various embodiments related to the aspects above.

BRIEF DESCRIPTION OF THE DRAWINGS

The present invention will now be described in more detail with reference to preferred embodiments, given only by way of example and illustrated in the accompanying drawings, in which.

DETAILED DESCRIPTION OF EMBODIMENTS OF THE INVENTION

The present description relates to the field of data communication or processing devices, having a data input interface comprising a keypad and a data output interface comprising a display. The data communication or processing devices are in short denoted terminal in this disclosure, and includes all mobile equipment devised for radio communication with a radio station, which radio station also may be mobile terminal or e.g. a stationary base station. Consequently, the term terminal includes data communication devices such as mobile telephones, pagers, communicators, electronic organisers, smartphones, PDA:s (Personal Digital Assistants) and DECT terminals (Digital Enhanced Cordless Telephony). Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawing.

Figure 1:
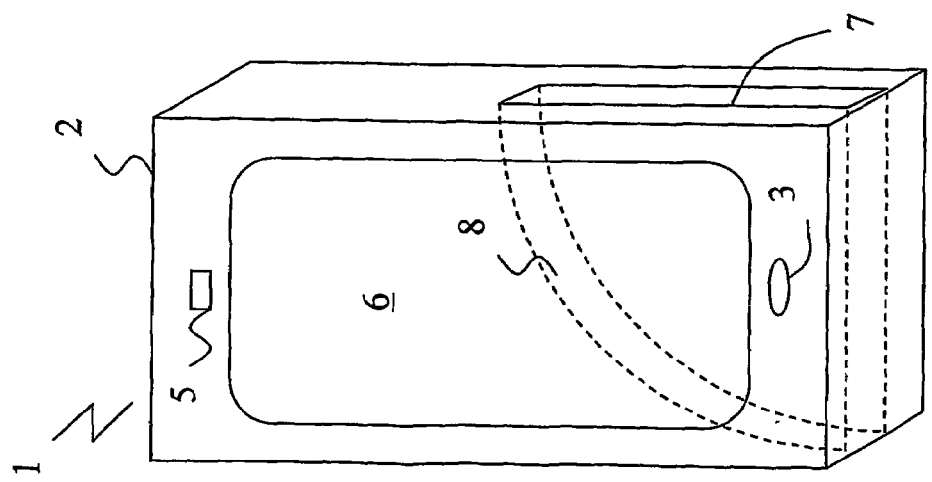
FIG. 1 schematically illustrates a perspective view of a first embodiment of the invention.

FIG. 1 illustrates a perspective view of a terminal 1, such as a radio communication terminal. The terminal 1 comprises a terminal body 2 carried in a chassis, directly or indirectly supporting the other components of the terminal. The terminal body 2 is defined by a front face, illustrated in the drawing, and a back face opposite to the front face. Terminal 1 is devised with a user-input interface, in the displayed embodiment comprising a microphone 3 and a keypad 4, although keyboard 4 has been eliminated in FIG. 1 for the sake of clarity. Furthermore, a user output interface of the terminal 1 comprises a loudspeaker 5 and a display 6, preferably disposed on a front face of the terminal body 2. The display 6 may also be touch-sensitive, thereby acting also as a data input interface. All of these features are well known in the prior art. Though not shown in FIG. 1, terminal 1 preferably further includes an antenna, radio transmission and reception electronics, and preferably a power supply in the form of a battery. Terminal 1 is also devised with a computer system, including a microprocessor with associated memory and software.

As is evident from FIG. 1, the chassis or cover of terminal 1 forms an aperture or recess 7 on a side of the terminal, between the front and back faces of the terminal body 2. In accordance with the invention, this recess opens to a storage space 8 inside the terminal body 2, shown in phantom in FIG. 1. This storage space 8 is devised to house the keypad 4 when not in use. Furthermore, keypad 4 is extractable from storage space 8 to an operative position, in which it is accessible for a terminal user, as will be described.

Figure 2:
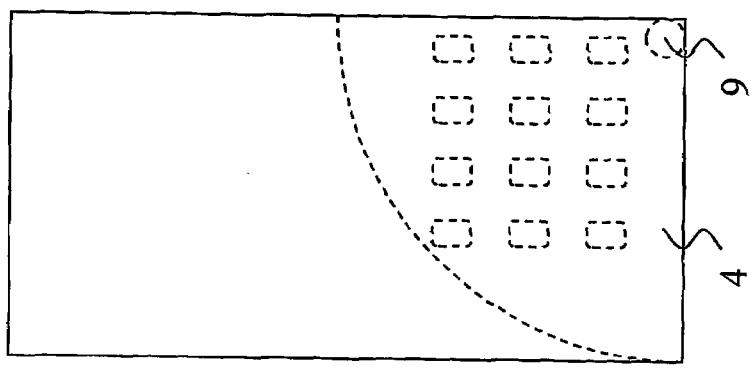
FIG. 2 illustrates the terminal of FIG. 1 in a first state, with its keyboard stowed.

FIG. 2 illustrates terminal one as seen from the front face, with keypad 4 illustrated in a stowed position. Keypad 4 is preferably shaped to fit in the storage space 8. Keyboard 4 is mounted to the terminal body 2 via a hinge device 9, such as a rotation shaft, about which keyboard 4 is rotatable. Though not shown, a first latch is preferably included to securely but releasably hold keyboard 4 in the stowed position shown in FIG. 2.

Figure 3:
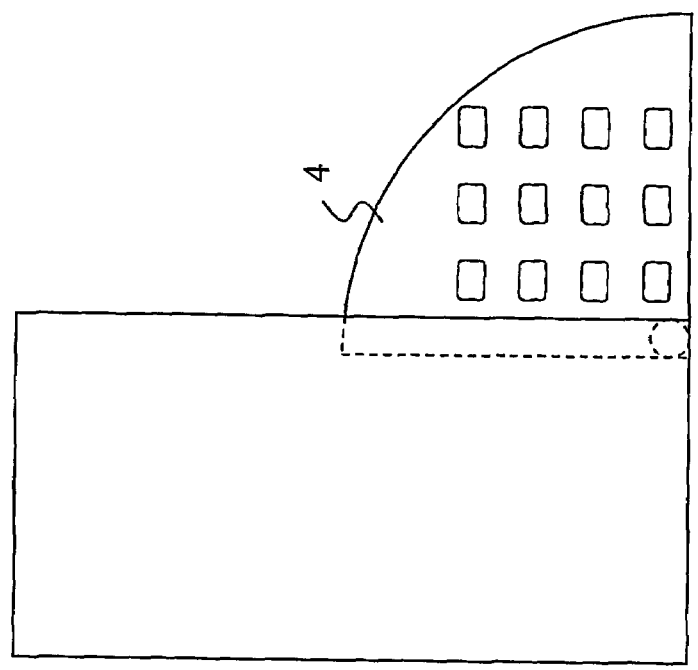
FIG. 3 illustrates the terminal of FIG. 1 in a second state, with the keyboard in an operative position.

FIG. 3 illustrates terminal 1 when the keyboard 4 has been extracted from storage space 8, by rotation, to the operative position. In this specific embodiment, the keyboard is positioned beside the terminal body 2 in the operative position, but as the skilled person realises the terminal may likewise be arranged such that keyboard 4 is rotated to a position below the terminal body 2. As for the stowed position, a second latch, is preferably included to securely but releasably hold keyboard 4 in the operative position shown in FIG. 3.

Means are by necessity included for linking the keys of keyboard 4 to the circuitry of the terminal body 2, for the purpose of relaying input data to the microprocessor of the terminal. The specific way of implementing such an electrical connection is not relevant to the invention, though.

The embodiment illustrated in FIGS. 1 to 3 have the benefit of providing more space on the front face of the terminal for the display, compared design in which the keyboard is firmly disposed on said front face. Furthermore, the keyboard will be safely stowed when not used, thereby rendering a solid construction. Compared to solutions in which the keyboard is devised on a flip, or on a so called clamshell member of the terminal, the keyboard can be completely tucked away when not in use, which means that a more compact design is provided. Extraction of the keyboard may be manual, by simply applying a pulling force on a knob (not shown) on the part of the keyboard positioned by the recess 7 in the stowed position, overcoming the retaining force of said first latch. Optionally, the keypad 4 may be biased by a spring device to assume the operative position, wherein a release button or the like is included for releasing said first latch.

Figure 4:
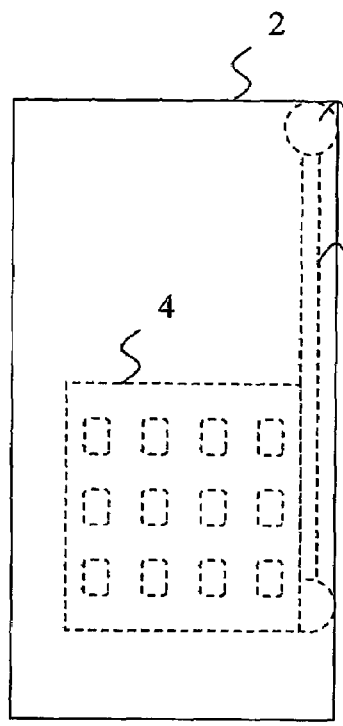
FIG. 4 schematically illustrates a second embodiment of the invention, with its keyboard stowed.

FIG. 4 illustrates another embodiment of terminal 1, apart from the features relating to the keypad comprising the features outlined in conjunction with FIG. 1. The same references are used for corresponding items. In this embodiment, keyboard 4 is connected to the terminal body 2 via a lever 10, connected by hinge device 9 to the terminal body 2. FIG. 4 illustrates the stowed state or position of keyboard 4.

Figure 5:
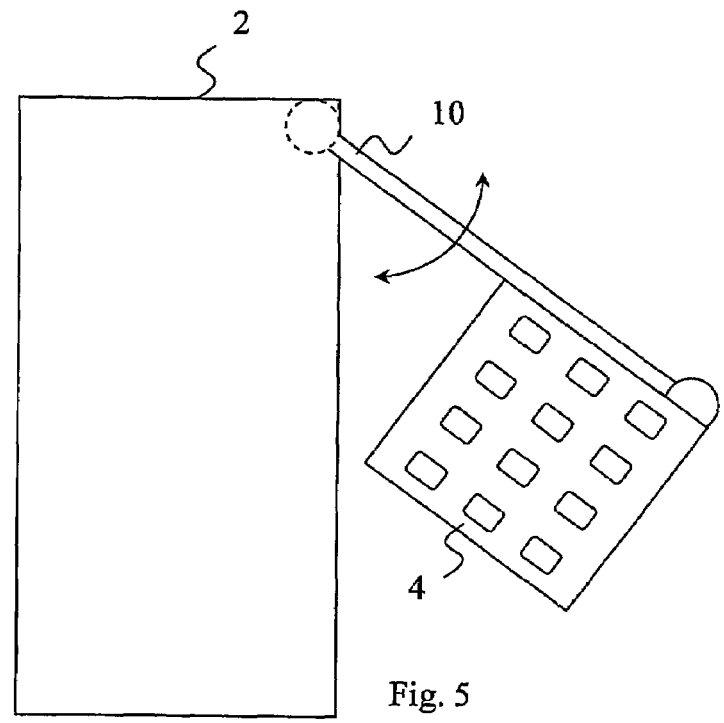
FIG. 5 illustrates the terminal of FIG. 4 when the keyboard has been extracted.

FIG. 5 illustrate that when keyboard 4 is extracted to the operative position outside terminal body 2, the lever is rotated about a rotation axis defined by hinge device 9, as is indicated by the arrow in the drawing. As for the first embodiment, extraction may be manual or include a biased spring device.

Figure 6:
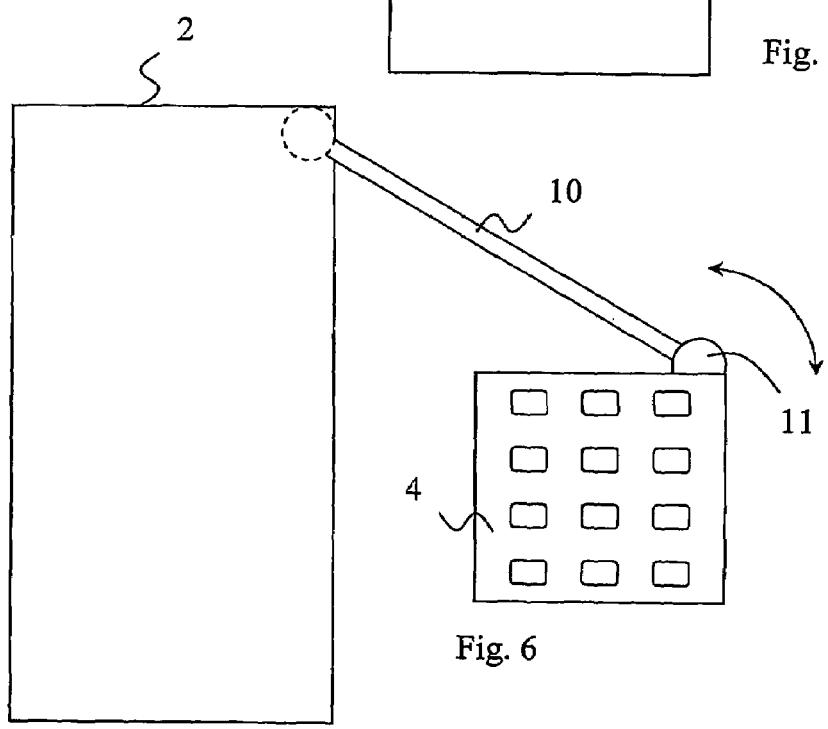
FIG. 6 illustrates, the terminal of FIG. 4 when the keyboard has been extracted and rotated.

FIG. 6 illustrates how keyboard 4, once it has been extracted, may be freely rotated about a point of articulation 11, at which lever 10 is connected to keyboard 4. This is illustrated by the arrow in the drawing. This way, any angular orientation of keypad 4 in relation to terminal body 2 may be assumed, though the rotation of keypad 4 may be restricted to a range of degrees.

A benefit with this embodiment is that the orientation of keypad 4 is freely set. This brings about the effect that the keyboard may be arranged adjacent one of the longer of the sides of the terminal 1, as in FIG. 6, and further be rotated such that the terminal body 2 may be held above the keypad 4. In such an orientation, the display 6 of the terminal will be arranged in a laptop-like manner, i.e. in an orientation where the width of the display 6 is larger than the height, which for certain applications may be preferred, such as for writing.

With a design according to FIGS. 4 to 6, the recess 7 opening into the storage space 8, none of which are illustrated in FIGS. 4 to 6, will either have to be larger than what is shown in FIG. 1, in order to house lever 10, or lever 10 may be arranged outwardly of terminal body 2.

Figure 7:
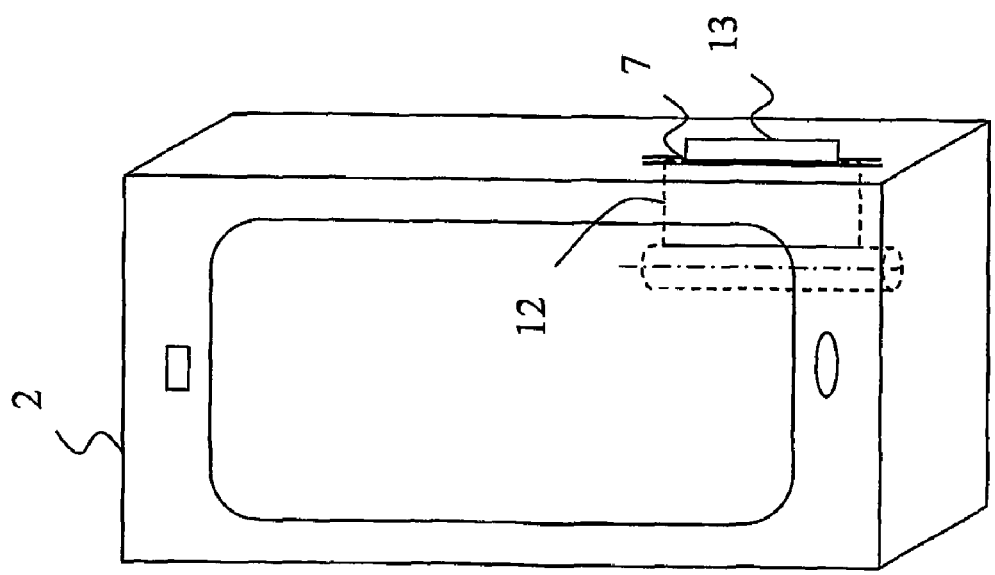
FIG. 7 schematically illustrates a perspective view of a third embodiment of the invention.

FIG. 7 illustrates yet another embodiment of the invention. Terminal 1 corresponds to the drawing of FIG. 1, apart from the features related to the keyboard, and are not repeated here. Terminal body 2 has a recess or slot 7, leading to a storage space 8 for keypad 4. In this case, the keypad 4 is disposed on a film 12, which is flexible at least in its rested state. Preferably a gripping portion 13 of film 12 extends outside the slot 7, even in the rested, stowed, state of the keypad 4. In one embodiment, the material of film 12 is such that certain atoms in the material are dislocated when an electrical current is passed through the material, upon which the film 12 transforms from its flexible state to a stiff state. A film having theses properties is preferably made from a polymer, and is known as such.

Figure 8:
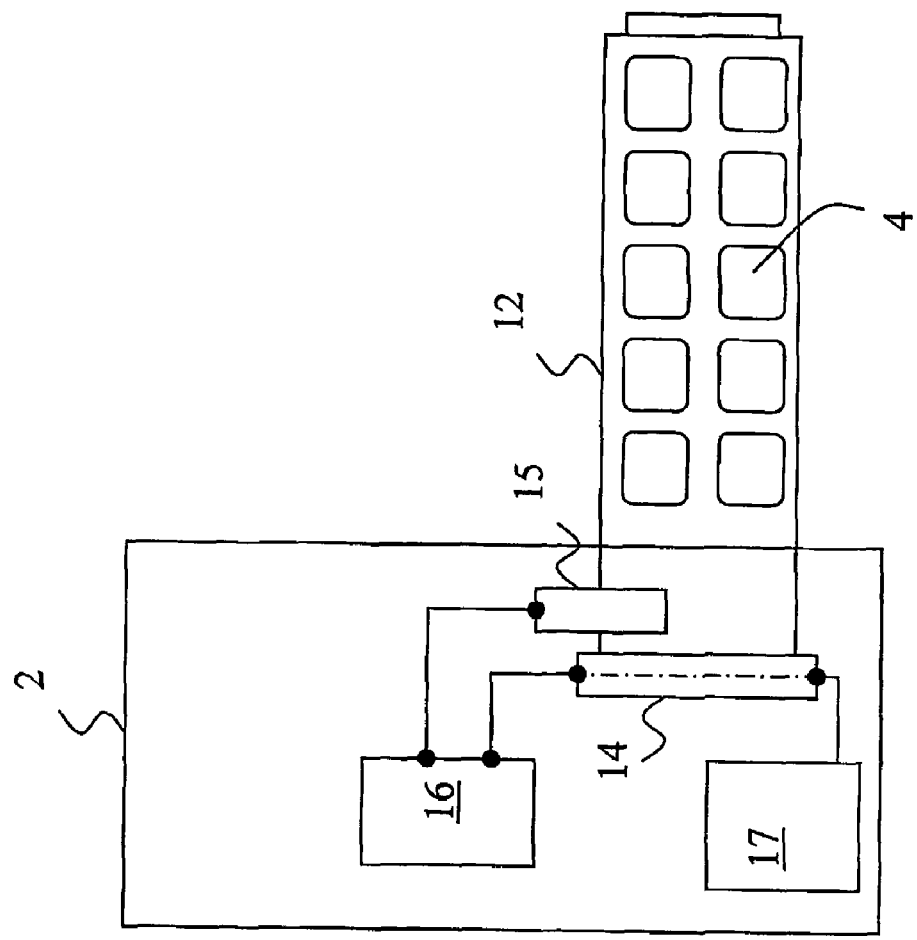
FIG. 8 illustrates the terminal of FIG. 7 when the keyboard has been extracted.

FIG. 8 illustrates the interior of the terminal body 2, when keyboard 4 has been extracted from the terminal body 2. A pulley 14 is arranged for rolling up the film 12 when in its rested state. The terminal body comprises activator means 15 for applying an electrical current through said film, wherein said film is devised to become stiff upon said current application. The activator means 15 preferably has two or more connection pads arranged in contact with a surface of the film 12.

The pulley 14 includes a roller and retractor means, which are biased to retract said film 12 into said storage space 8. This may function like a window shade. Preferably, detector means 16 are connected to the pulley 14, and devised to detect when said film 12 has been extracted to a fully extracted position, as illustrated in FIG. 8. When this position is detected, said detector means 16 trigger the activator means 15 to apply an electrical through said film. This way the film 12 stiffens in the extracted position, making it easier to operate for a user. Preferably, said pulley 14 is locked when the film as reached the extracted position.

In order to bring the film back to the storage space 8, a pulling force is applied to the film 12. Said detector means 16 are devised to detect when a pulling force is applied on said film e.g. at the gripping portion 13, when the film is located in said fully extracted position, whereupon the detector means 16 controls the activator means 15 to stop applying a current through the film 12. This way, the film 12 becomes flexible again. The pulling force also unlocks the pulley and releases a biased spring device which pulls the film back around the roller of the pulley 14. The keys of the keypad 4 are connected to the microprocessor system 17 of the terminal, e.g. through said pulley 14.

In an alternative embodiment to that which is shown in FIGS. 7 and 8, the flexible film may be designed to stiffen by means of its shape. Such an embodiment may be based on a measuring-tape design, in which the film is slightly curved to e.g. a shallow U-shape, in a cross-section transverse the longitudinal extension of the film. By maintaining this shape outside the terminal, the film will automatically maintain a straight shape, unless intentionally bent. In such an embodiment, slot 7 may be curved to said shallow U-shape. The film may be made in any suitable material, such as plastics or metal. For a metal embodiment, the film 12 itself may be used as one lead to each of the keys 4 disposed thereon. Preferably, metal film 12 is covered by a rubber coat or the like, in which the key switches are embedded. In order to save weight, the film 12 may be made in a polymer or plastic material, having metal edge portions at least on the longer side portions of the film. Also in such an embodiment may the metal parts of the film be used as a lead to the respective keys 4 on the film 12.

As for the embodiments of the previous figures, the keypad 4 may of course be extracted from any side of the terminal body 2.

The foregoing has described the principles, preferred embodiments and modes of operation of the present invention. However, the invention should not be construed as being limited to the particular embodiments discussed above. For one thing, the keypad may be numerical but In an alternative embodiment, the keypad is alpha-numerical, also providing the capability of input of letters or other symbols. The above-described embodiments should be regarded as illustrative rather than restrictive, and it should be appreciated that variations may be made in those embodiments by workers skilled in the art without departing from the scope of the present invention, as defined by the following claims.

The invention claimed is:

1. A terminal comprising:
   a terminal body;
   a data output interface comprising a display disposed on a face of said terminal body; and
   a data input interface comprising a keypad, which is extractable by a linear movement from a storage space inside said terminal body, wherein said keypad is disposed on a flexible film supported by a pulley comprising a retractor mechanism that is biased to retract said film into said storage space, wherein said terminal body comprises an activator mechanism that is configured to apply an electrical current through said film, wherein said film comprises a material which is configured to change from a flexible mode to a stiff mode responsive to application of the electric current to become stiff along a longitudinal extension thereof supporting the keypad to support typing on the keypad.

2. The terminal as recited in claim 1, wherein said terminal body has a front face supporting said display, and a back face opposite said front face, wherein said keypad is extractable from an aperture disposed at a side of said terminal between said front face and said back face.

3. The terminal as recited in claim 1, wherein said keypad comprises a gripping portion at an outer end of said film.

4. The terminal as recited in claim 1, wherein said pulley is configured to retract and roll up said film, when in a flexible mode, about a roller.

5. The terminal as recited in claim 1, further comprising a detector mechanism that is configured to detect when said film has been extracted from said storage space to a fully extracted position and to respond to that detection by causing said activator mechanism to apply an electrical current through said film.

6. The terminal as recited in claim 5, wherein said detector mechanism is configured to detect when a pulling force is applied on said film when the film is located in said fully extracted position, whereupon said detector mechanism causes said activator mechanism to stop applying the electric current to said film.

7. The terminal as recited in claim 1, wherein said pulley comprises a locking mechanism that is configured to inhibit movement by said retractor mechanism when said film has been extracted from said storage space to a frilly extracted position.

8. A terminal comprising:
a terminal body;
a data output interface comprising a display disposed on a face of said terminal body; and
a data input interface comprising a keypad, which is extractable by a linear movement from a storage space inside said terminal body, wherein said keypad is disposed on a flexible film supported by a pulley comprising a retractor mechanism that is biased to retract said film into said storage space, wherein the flexible film is curved with a shallow U-shape in a cross-section transverse the longitudinal extension of the film when extracted from said storage space and the film maintains the cross-sectional shallow U-shape to automatically maintain a straight longitudinal extension shape outside said storage space of the terminal body.

9. The terminal as recited in claim 8, wherein the flexible film is extractable through a slot having a curvature that corresponds to the shallow U-shape of the flexible film as the film is extracted from said storage space of the terminal body.

10. The terminal as recited in claim 1, wherein said terminal comprises a radio communication terminal.

11. A terminal comprising:
a terminal body;
a data output interface comprising a display disposed on a face of said terminal body;
a data input interface comprising a keypad, which is extractable by a linear movement from a storage space inside said terminal body, wherein said keypad is disposed on a flexible film supported by a pulley comprising a retractor mechanism that is biased to retract said film into said storage space, wherein said terminal body comprises an activator mechanism that is configured to apply an electrical current through said film, wherein said film comprises a material which is configured to change from a flexible mode to a stiff mode responsive to application of the electric current to become stiff along a longitudinal extension thereof supporting the keypad to support typing on the keypad; and
a detector mechanism that is configured to detect when said film has been extracted from said storage space to a fully extracted position and to respond to that detection by causing said activator mechanism to apply an electrical current through said film.

12. The terminal as recited in claim 11, wherein said detector mechanism is configured to detect when a pulling force is applied on said film when the film is located in said fully extracted position, whereupon said detector mechanism causes said activator mechanism to stop applying the electric current to said film to return said film to the flexible mode so that the pulley retracts and rolls up said film about a roller.

13. The terminal as recited in claim 12, wherein said pulley comprises a locking mechanism that is configured to inhibit movement by said retractor mechanism when said film has been extracted from said storage space to a fully extracted position, and configured to allow retraction and roll up of said film about the roller when the pulling force is applied on said film when the film is located in said fully extracted position.

* * * * *

UNITED STATES PATENT AND TRADEMARK OFFICE
CERTIFICATE OF CORRECTION

PATENT NO.        : 7,382,355 B2                                       Page 1 of 1
APPLICATION NO. : 10/550031
DATED             : June 3, 2008
INVENTOR(S)       : Hermann It is certified that error appears in the above-identified patent and that said Letters Patent is hereby corrected as shown below:

Column 7, Claim 7, Line 37:   Please correct "frilly extracted"
                              To read -- fully extracted --

Signed and Sealed this

Fifth Day of August, 2008

JON W. DUDAS
*Director of the United States Patent and Trademark Office*